(12) United States Patent
Gunasekaran et al.

(10) Patent No.: US 9,590,898 B2
(45) Date of Patent: Mar. 7, 2017

(54) METHOD AND SYSTEM TO OPTIMIZE PACKET EXCHANGE BETWEEN THE CONTROL AND DATA PLANE IN A SOFTWARE DEFINED NETWORK

(71) Applicant: Telefonaktiebolaget L M Ericsson (publ), Stockholm (SE)

(72) Inventors: Amudhan Gunasekaran, Bangalore (IN); Bhalaji Narayanan, Bangalore (IN); Periyasamy Palanisamy, Bangalore (IN); Sasidharan Sambasivam, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 192 days.

(21) Appl. No.: 14/624,554

(22) Filed: Feb. 17, 2015

(65) Prior Publication Data
US 2016/0241467 A1 Aug. 18, 2016

(51) Int. Cl.
| | | |
|---|---|---|
| H04L 12/66 | (2006.01) | |
| H04L 12/717 | (2013.01) | |
| H04L 29/12 | (2006.01) | |
| H04L 12/741 | (2013.01) | |
| H04L 12/715 | (2013.01) | |

(52) U.S. Cl.
CPC ............ H04L 45/42 (2013.01); H04L 45/74 (2013.01); H04L 61/103 (2013.01); H04L 45/64 (2013.01); H04L 61/6022 (2013.01)

(58) Field of Classification Search
CPC ......... H04L 45/42; H04L 45/74; H04L 45/64; H04L 61/103; H04L 61/6022
See application file for complete search history.

(56) References Cited

U.S. PATENT DOCUMENTS

| | | | | |
|---|---|---|---|---|
| 5,001,642 A | * | 3/1991 | Botzenhardt | ......... H04L 25/026 123/480 |
| 5,553,095 A | * | 9/1996 | Engdahl | ............. G05B 19/0421 370/462 |
| 6,263,422 B1 | * | 7/2001 | Wise | ..................... G06F 9/3867 375/E7.093 |

(Continued)

OTHER PUBLICATIONS

Pfaff et al., "OpenFlow Switch Specification," Version 1.3.1 (Wire Protocol 0x04), 'https://www.opennetworking.org/images/stories/downloads/sdn-resources/onf-specifications/openflow/openflow-spec-v1.3.1.pdf,' The Open Networking Foundation copyright 2012; Sep. 6, 2012; 128pgs.

(Continued)

*Primary Examiner* — Thai Hoang
(74) *Attorney, Agent, or Firm* — Nicholson De Vos Webster & Elliott LLP

(57) ABSTRACT

A method in a network controller of a control plane in a software defined network (SDN) coupled to a plurality of network elements (NEs) of a data plane in the SDN is described. The method includes causing the plurality of NEs to install one or more packet handling rules for a selected type of packet so that the NEs forward only a subset of data for each packet of the selected type to the network controller. The method further includes receiving the subset of data for each packet of the selected type and composing a whole packet of the selected type that includes the subset of data.

18 Claims, 11 Drawing Sheets

(56) References Cited

U.S. PATENT DOCUMENTS

| | | | | |
|---|---|---|---|---|
| 7,310,670 | B1* | 12/2007 | Walbeck | H04B 3/54 709/225 |
| 2006/0248208 | A1* | 11/2006 | Walbeck | H04L 29/06 709/230 |

OTHER PUBLICATIONS

Postel, J., 'User Datagram Protocol,' RFC 768; Aug. 28, 1980; 3pgs.
Deering, S. et al., 'Internet Protocol, Version 6 (IPv6) Specification,' Network Working Group; RFC 2460; Dec. 1998; 39pgs.
Borman, D. et al., 'IPv6 Jumbograms,' Network Working Group; RFC 2675; Aug. 1999; 9pgs.
Fenner, B. et al., 'Management Information Base for the User Datagram Protocol (UDP),' Network Working Group; RFC 4113; Jun. 2005; 19pgs.
Eggert, L. et al., 'Unicast UDP Usage guidelines for Application Designers,' Network Working Group; RFC 5405; Nov. 2008; 27pgs.
Postel, J, 'Transmission Control Protocol,' Darpa Internet Program Protocol Specification, RFC 793; Sep. 1981; 89pgs.
Socolofsky, T. et al., 'A TCP/IP Tutorial,' Network Working Group; RFC 1180; Jan. 1991; 28pgs.
Nichols, K. et al., 'Definition of the Differentiated Services Field (DS Field) in the IPv4 and IPv6 Headers,' Network Working Group; RFC 2474; Dec. 1998; 20pgs.
Blake, S. et al., 'An Architecture for Differentiated Services,' Network Working Group; RFC 2475; Dec. 1998; 36pgs.
Heinanen, J. et al., 'Assured Forwarding PHB Group,' Network Working Group; RFC 2597; Standards Track, Jun. 1999; 11pgs.
Black, D., 'Differentiated Services and Tunnels,' Network Working Group; RFC 2983; Oct. 2000; 14pgs.
Nichols, K. et al., 'Definition of Differentiated Services Per Domain Behaviors and Rules for their Specification,' Network Working Group; RFC 3086; Apr. 2001; 24pgs.
Black, D. et al., 'Per Hop Behavior Identification Codes,' Network Working Group; RFC 3140; Jun. 2001; 8pgs.
Davie, B., 'An Expedited Forwarding PHB (Per-Hop Behavior),' Network Working Group; RFC 3246; Mar. 2002; 16pgs.
Charny, A. et al., 'Supplemental Information for the New Definition of the EF PHB (Expedited Forwarding Per-Hop Behavior),' Network Working Group; RFC 3247; Mar. 2002; 24pgs.
Grossman, D., 'New Terminology and Clarifications for Diffserv,' Network Working Group; RFC 3260; Apr. 2002; 10pgs.
Babiarz, J. et al., 'Configuration Guidelines for DiffSery Service Classes,' Network Working Group; RFC 4594; Aug. 2006; 57pgs.
Baker, F. et al., 'A Differentiated Services Code Point (DSCP) for Capacity-Admitted Traffic,' Internet Engineering Task Force (IETF); RFC 5865; May 2010; 14pgs.
Baker, F. et al., ;Management Information Base for the Differentiated Services Architecture, Network Working Group, RFC 3289; May 2002; 116pgs.
Bernet, Y. et al., 'An Informal Management Model for Diffsery Routers,' Network Working Group; RFC 3290; May 2002; 56pgs.
Chan, K., et al., 'Differentiated Services Quality of Service Policy Information Base,' Network Working Group; RFC 3317; Mar. 2003; 96pgs.

* cited by examiner

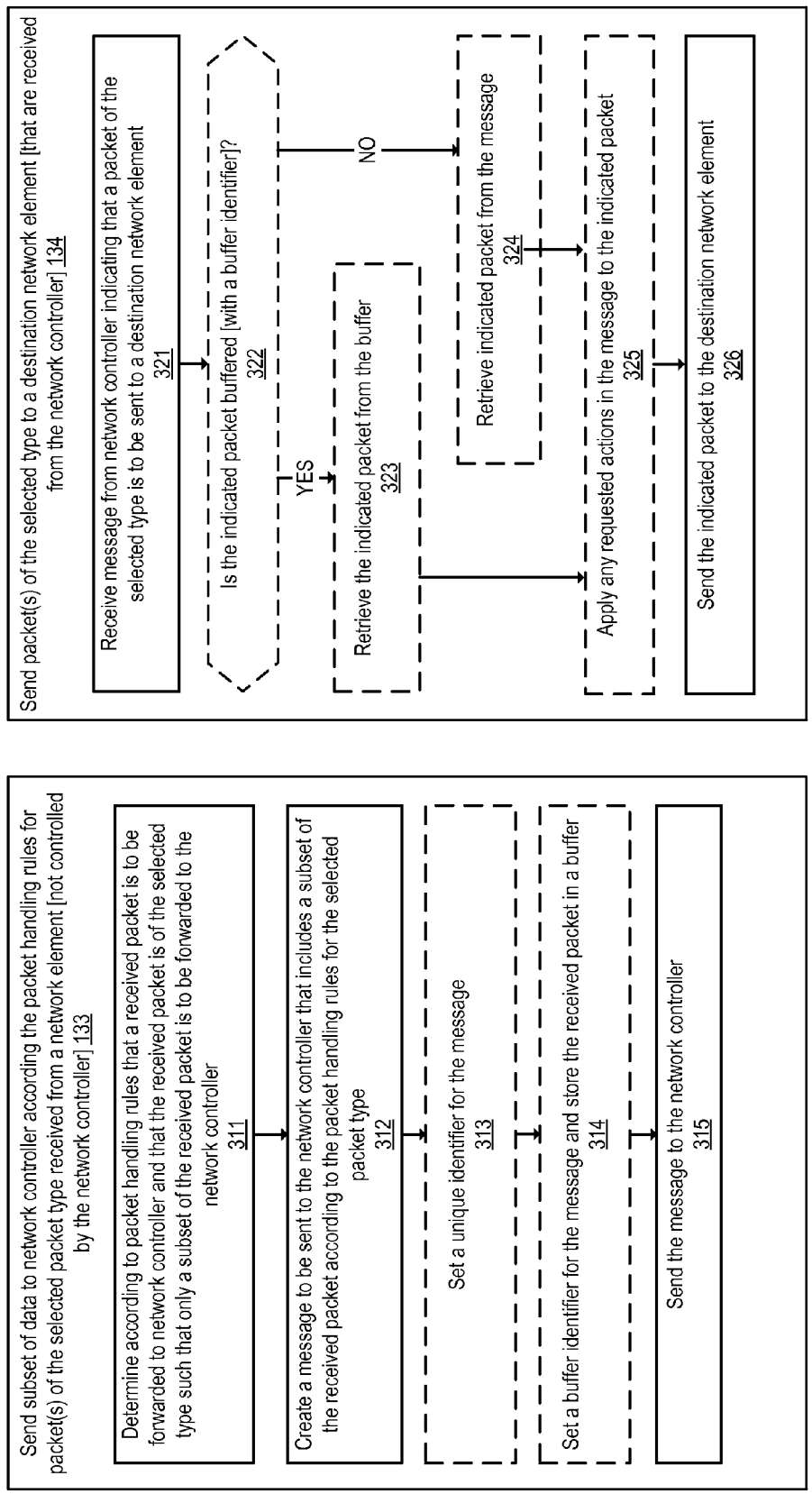

```
struct eric_action_output {
    uint16_t type;  /* OFPAT_OUTPUT */
    uint16_t len;   /* Length */
    uint32_t port;  /* OFPP_CONTROLLER  - Output to Controller*/
    struct eric_pkt_range fields[0];    /* Range of Fields */
};
OFP_ASSERT(sizeof(struct eric_action_output) == 8);

struct eric_pkt_range {
    uint16_t start_index;  /* Starting Index of the byte of the packet */
    uint16_t len;   /* No of bytes should be sent from start_index */
};
OFP_ASSERT(sizeof(struct eric_pkt_range) == 4);
```

Cause the plurality of NEs to install one or more packet handling rules for a selected type of packet so that the NEs forward only a subset of data for each packet of the selected type to the network controller
602

Receive the subset of data for each packet of the selected type and composing a whole packet of the selected type that includes the subset of data
604

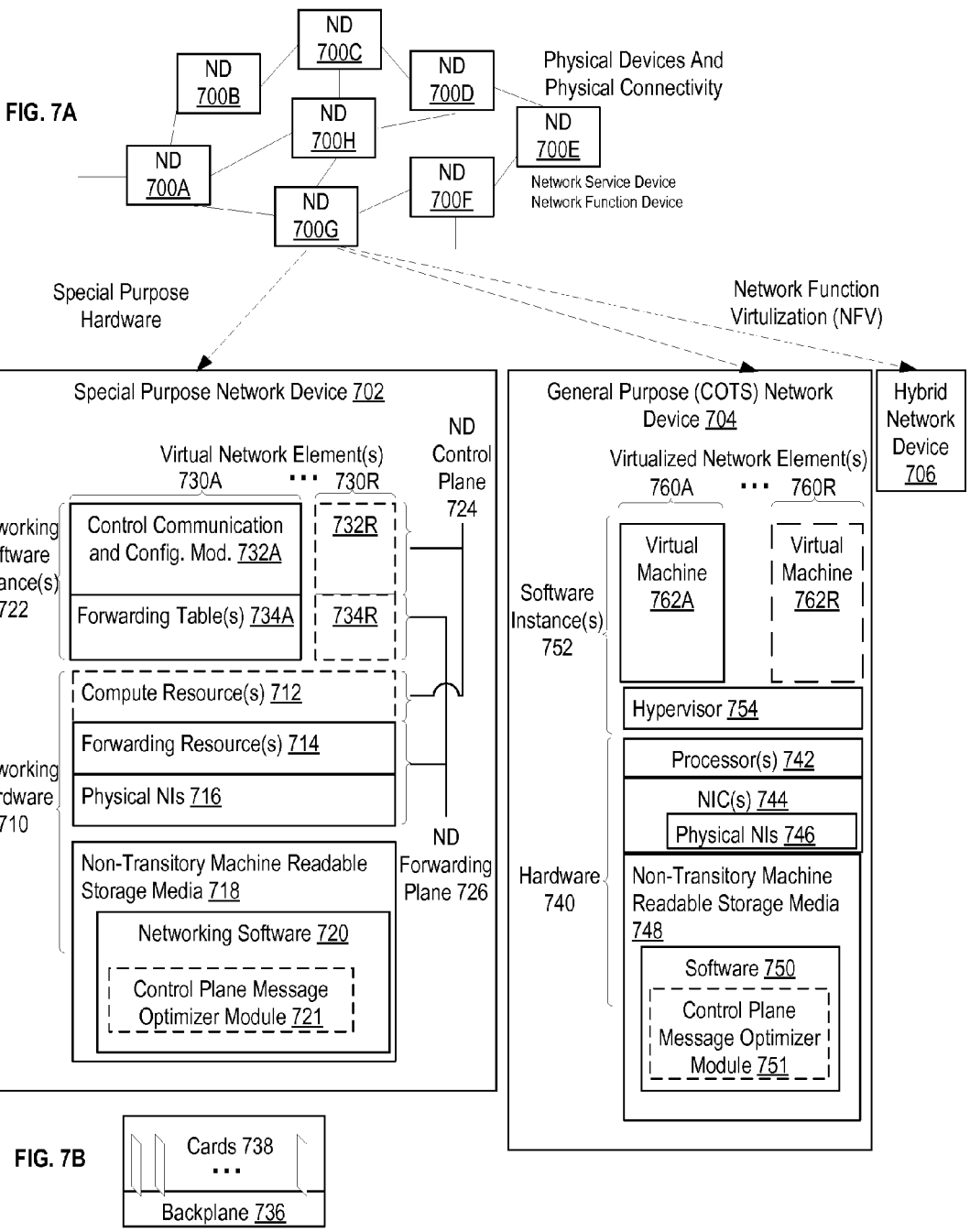

METHOD AND SYSTEM TO OPTIMIZE PACKET EXCHANGE BETWEEN THE CONTROL AND DATA PLANE IN A SOFTWARE DEFINED NETWORK

FIELD

Embodiments of the invention relate to the field of software-defined networking (SDN); and more specifically, to a method and system to optimize packet exchange between the control and data plane in a software defined network.

BACKGROUND

Software Defined Networking (SDN) is an approach to computer networking that allows network administrators to manage network services through abstraction of lower-level functionality. This is done by decoupling the system that makes decisions about where traffic is sent (the control plane) from the underlying systems that forward traffic to the selected destination (the data plane). In such a system, a network controller has the role of the control plane and is coupled to one or more network elements have the role of the data plane. The network controller communicates with the network elements using a SDN protocol (e.g. OpenFlow). The network controller, acting as the control plane, may then program the data plane on the network elements by causing packet handling rules to be installed on the network elements. These packet handling rules may have criteria to match various packet types as well as actions that may be performed on those packets. For example, the network controller may program the network elements to forward packets with a specific destination address a certain way in the network.

In some cases, the network controller may also request network elements to forward packets to the network controller. This may be so that the network controller may analyze the content of the packets, as it may not have encountered the type of packet or the content in the packet previously. This may also be so that an application in an application layer coupled to the network controller may be able to make use of the packet. However, the current communication of packet data between the network elements and the network controller is data intensive and thus a more optimized solution is desirable.

SUMMARY

According to some embodiments of the invention, a method in a network controller of a control plane in a software defined network (SDN) coupled to a plurality of network elements (NEs) of a data plane in the SDN is described. The method includes causing the plurality of NEs to install one or more packet handling rules for a selected type of packet so that the NEs forward only a subset of data for each packet of the selected type to the network controller.

According to some embodiments, the causing the plurality of NEs to install one or more packet handling rules for a selected type of packet further comprises determining one or more packet fields that are needed for the selected packet type and identifying byte sequence ranges for these packet fields; indicating the identified byte sequence ranges for the selected packet type in a packet handling rule for packets of the selected type that are sent to the network controller, wherein each byte sequence range includes a byte start value and a byte length value; and sending a message including the packet handling rule to the plurality of NEs to cause the plurality of NEs to install the packet handling rule in their forwarding tables.

According to some embodiments, the method further comprises indicating in the packet handling rule for packets of the selected type that a unique identifier for the selected packet type is included with the subset of data that is sent to the network controller. According to some embodiments, the SDN is an OpenFlow network.

According to some embodiments, the one or more packet fields are determined to be needed for the selected packet type based upon analyzing packet fields of that packet type used by applications in an application layer, wherein the application layer is coupled to the network controller at a northbound interface.

The method further includes receiving the subset of data for each packet of the selected type and composing a whole packet of the selected type that includes the subset of data.

According to some embodiments, the receiving the subset of data for each packet type of the selected type further comprises receiving a message from a network element with raw packet bytes; determining based on at least one of a unique identifier in the message and analysis of the raw packet bytes that the raw packet bytes are of a packet of the selected type and only includes the subset of data for the packet type; and creating the whole packet of the selected type that includes the raw packet bytes placed in the correct byte locations for that packet type According to some embodiments, the selected packet type is an address resolution protocol (ARP) type packet, and wherein the subset of data includes the sender media access control (MAC) address, sender Internet protocol (IP) address, and target IP address.

Thus, embodiments of the invention include a method and system to optimize packet exchange between the control and data plane in a software defined network.

BRIEF DESCRIPTION OF THE DRAWINGS

The invention may best be understood by referring to the following description and accompanying drawings that are used to illustrate embodiments of the invention. In the drawings:

FIG. 3A is a flow chart illustrating in detail the operations of block 133 (circle 6) for a method and system to optimize packet exchange between the control and data plane in a software defined network according to an embodiment of the invention.

FIG. 3B is a flow chart illustrating in detail the operations of block 134 for a method and system to optimize packet exchange between the control and data plane in a software defined network according to an embodiment of the invention.

FIG. 4 illustrates an exemplary structures 400 for defining a set of byte sequences for a packet handling rule to be sent in a message to a network element according to an embodiment of the invention.

FIG. 7A illustrates connectivity between network devices (NDs) within an exemplary network, as well as three exemplary implementations of the NDs, according to some embodiments of the invention.

FIG. 7B illustrates an exemplary way to implement the special-purpose network device 702 according to some embodiments of the invention.

DESCRIPTION OF EMBODIMENTS

Figure 1:
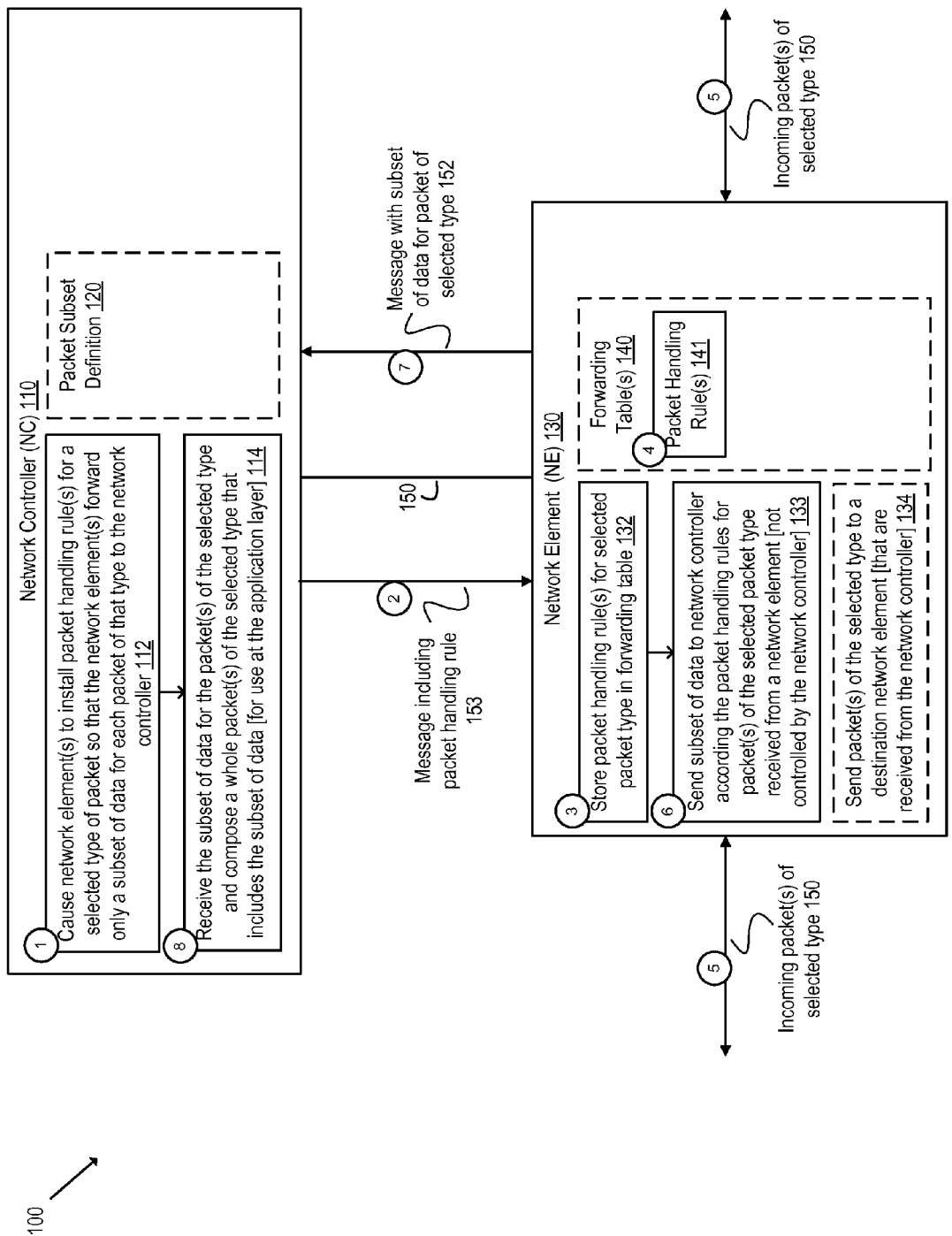
FIG. 1 illustrates a method and system 100 to optimize packet exchange between the control and data plane in a software defined network according to an embodiment of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

FIG. 1 illustrates a method and system 100 to optimize packet exchange between the control and data plane in a software defined network according to an embodiment of the invention. In FIG. 1, the circled numbers are used to denote transactions performed by the elements in the system. The order/sequence of the transactions in FIG. 1 is shown for illustrative purposes, and is not intended to be limitations of the present invention.

System 100 includes a software-defined network (SDN) represented by network controller (NC) 110 and network element (NE) 130. Although the SDN may include additional NEs controlled by the NC, they are not shown here for ease of understanding. Thus when the description below refers to NE 130, one can assume that the description may also be referring to additional NEs in the SDN that are controlled by NC 110.

In an SDN, the functionalities associated with the control plane and the data plane of a traditional network device are decoupled. In the illustrated embodiment, the network controller 110 acts as the control plane and the NEs, including NE 130, act as the data plane. The control plane device in the SDN communicates with the data plane devices using an SDN communications protocol (e.g., OpenFlow; defined by the Open Networking Foundation). The structure of the SDN is described in further details in reference to FIGS. 7A, 7B, 7C, and 8.

An SDN network provides a network administrator with a centrally managed control plane (e.g., the network controller 110) and may simplify management and reduce costs. Unlike a traditional network device where the control plane and data plane reside on one device, separating the control plane and data plane means that the control plane and data plane devices are now communicatively coupled using a link, such as link 150. This may introduce additional latencies and bandwidth limitations.

In some cases, one or more packets may need to be transferred between the control plane and the data plane in an SDN. In the SDN illustrated in FIG. 1, this creates traffic on the link 150 between NC 110 and NE 130. While on a traditional network device this may not be a large issue as the control plane and data plane likely share a very high speed interconnect, in an SDN the link between the NC and the NEs may not be as robust due to hardware limitations. Thus, there is a need to reduce the traffic on the link 150 between NC 110 and NE 130. According to some embodiments of the invention, one method of reducing the bandwidth on the link between the data plane and control plane elements in an SDN is to transfer on the link only those portions of the packets that are needed by the control plane element and allowing the control plane element. Such an embodiment will be described with further detail below.

At circle 1, in order to instruct NE 130 to transfer only those portions of the packet that are necessary for a selected packet type, NE 130 at block 112 causes NE 130 to install packet handling rule(s) for a selected type of packet so that NE 130 forwards only a subset of data for each packet of that type to the network controller. The type of a packet refers to its protocol (e.g., HTTP, ARP), content, or other defining characteristic that it may share with other packets. In some embodiments, the definition of what portions of the packets of the selected type should be subset are stored in packet subset definition 120. This definition may come from the requirements of an application on an application layer coupled to NC 110.

For example, a network traffic monitor application may wish to monitor traffic in the SDN but may only need to know the timestamp and destination domain name of Hypertext Transfer Protocol (HTTP) packets being sent through the network. In such a case, NE 130 should not send the entire HTTP packet to NE 130 for the network load monitor application to analyze, but should instead only send a subset including the timestamp portion and the host portion of any HTTP packets it encounters. As another example, NC 110 may need to resolve the media access control (MAC) address of a device on the network. In such a case, NE 130 may be interested in the information in an address resolution protocol (ARP) packet. However, it does not need to know everything in the packet, such as the Target MAC address, but may only need to know the Sender Internet Protocol (IP) address and the Sender MAC address.

In both these examples, NE 130 would be configured by NE 130 to forward only those parts of the selected packet types (e.g., HTTP, ARP) that are needed to perform whatever function is needed at NE 130. The operations at circle 1 will be described further with reference to FIG. 2A.

At circle 2, the packet handling rule(s) is sent to NE 130 in a message 153 on link 150. In some embodiments, this message 153 includes a structure that can define one or more byte start and length sequences for the selected packet type. These byte start and length sequences indicate what parts or subset of a selected packet type should be forwarded by NE 130 to NE 130 when NE 130 receives a packet(s) of that type. An example of such a structure for the message 153 sent at circle 2 will be described in detail in FIG. 4.

At circle 3 (block 132), the message 153 from NC 110 causes NE 130 to store the packet handling rule(s) for the selected packet type that it received in the message 153 in forwarding table 140. At circle 4, this newly stored rule is indicated as packet handling rule(s) 141 in the forwarding table 140. Note that although only one NE 130 is shown here, NC 110 may simultaneously send multiple messages like message 153 including the same packet handling rule(s) to multiple NEs in the SDN.

At circle 5, an incoming packet 150 is received at NE 130 from another network element. This incoming packet is of a selected type that has a packet handling rule 141 in the forwarding table 140 of NE 130. Note that two packets 150 are shown to indicate that the packet may arrive at any port on NE 130. In some embodiments, the incoming packet 150 arrives from a network element that the NC does not have control over (i.e., is not in the SDN controlled by NE 130).

At circle 6, NE 130 sends a message 152 to NE 130 including a subset of data according the packet handling rules for the packet 150. For example, using the example from above, if the incoming packet 150 is an HTTP packet, then NE 130 may only send the information in the timestamp and host fields of the HTTP packet to NE 130. The operations at circle 6 will be described with greater detail in reference to FIG. 3A.

At circle 7, message 152 travels along link 150 to NC 110. In some embodiments, message 152 may also include a unique identifier associated with the packet type of the previously incoming packet 150.

At circle 8, NC 110 receives the subset of data for the packet of that type. NC 110 further composes a whole packet of the selected type that includes the subset of data. Thus, referring again to the example above, NC 110 takes the host and timestamp fields and places them in a standard HTTP packet. The only fields in that HTTP packet that are populated with real data are the timestamp and host fields. The other fields may either be left blank or be filled with default values (e.g., zeros). This "reconstituted" packet is then used by NE 130 or a coupled application according to whatever needs of the application or NE 130. Again referring to the above example, the HTTP packet may then be passed to the network monitor application. Since the network monitor application only uses the timestamp and host fields of the HTTP packets it receives, it does not care about what is in the other fields. As long as the timestamp and host fields are in the correct byte address locations in the HTTP packet, then to the network monitor application, the whole process described above is transparent. The operations at circle 8 will be described with greater detail in reference to FIG. 2B below. Although a limited number of packet types are described above, the system may support packet types of any configuration as it defines the packet using byte start and length sequences. Additional examples of different packet types and how subsets of these packets may be communicated between the control and data plane elements of the SDN will be described with reference to FIGS. 5A-5C.

In some embodiments, at block 134, NE 130 receives and sends packets that are of a type that has a packet handling rule 141 to a destination network element. The packets that are sent and received are not subsets, but are of the whole packet. In some embodiments, the packet to be sent is indicated in a message by NE 130. In this case, NE 130 sends a message to NE 130 to cause NE 130 to send a packet to a destination network element. Further details regarding the operations at block 134 will be described below with reference to FIG. 3B.

The method and system to optimize packet exchange between the control and data plane in a software defined network, as described above and in the remaining portions of this description, has many unique advantages over traditional systems.

One advantage is that the traffic between the control and data planes is greatly reduced. In many cases, only a few fields in a packet may be required on the control plane side. However, traditional methods must transfer most of the packet over from the data plane to the control plane, which transfers the desired fields but also many undesired fields, which wastes considerable bandwidth.

Another advantage is that the system and method described does not require major changes in the SDN. Any application coupled to the control plane does not need to know that it is receiving a subset packet, as the subset data is placed into a whole packet before being presented to the application. The application may continue to search for the same fields or use the same byte offsets to retrieve the desired values from the packets it receives.

Furthermore, although the traditional method is not as efficient, since this improved system and method does not otherwise modify the SDN other than the changes described, this new improved method is still compatible with the traditional method in that both can co-exist in the same system without conflict. Thus, as described above and as will be described in further detail below, the embodiments of the invention for a method and system to optimize packet exchange between the control and data plane in a software defined network are a significant improvement over traditional systems and methods.

Figure 2B:
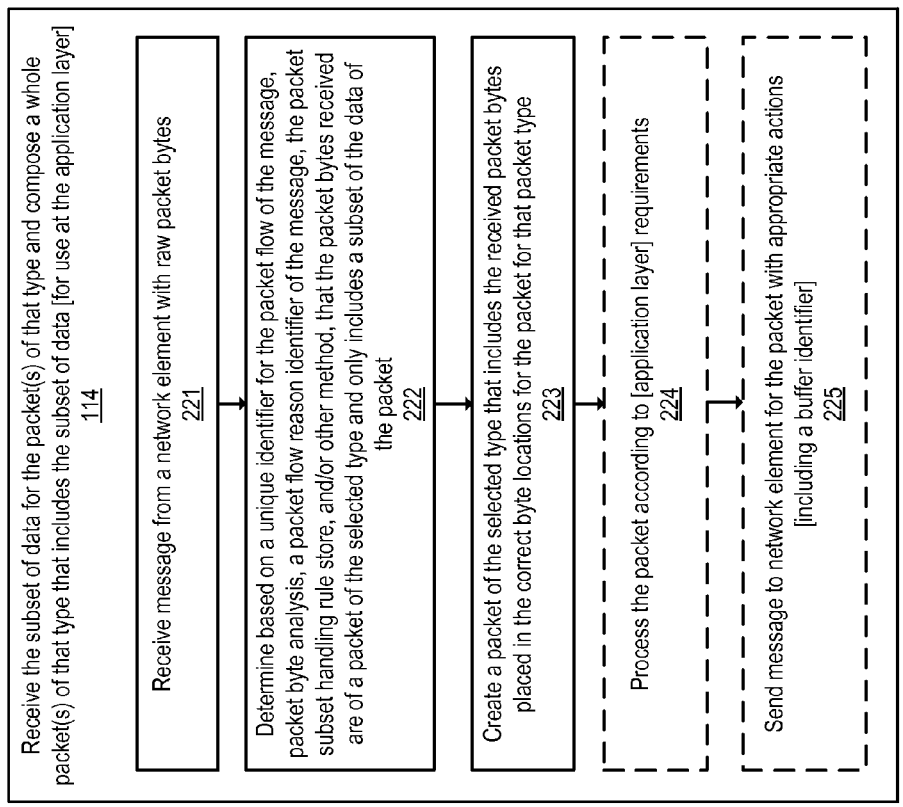
FIG. 2B is a flow chart illustrating in detail the operations of block 114 (circle 8) for a method and system to optimize packet exchange between the control and data plane in a software defined network according to an embodiment of the invention.
Figure 2A:
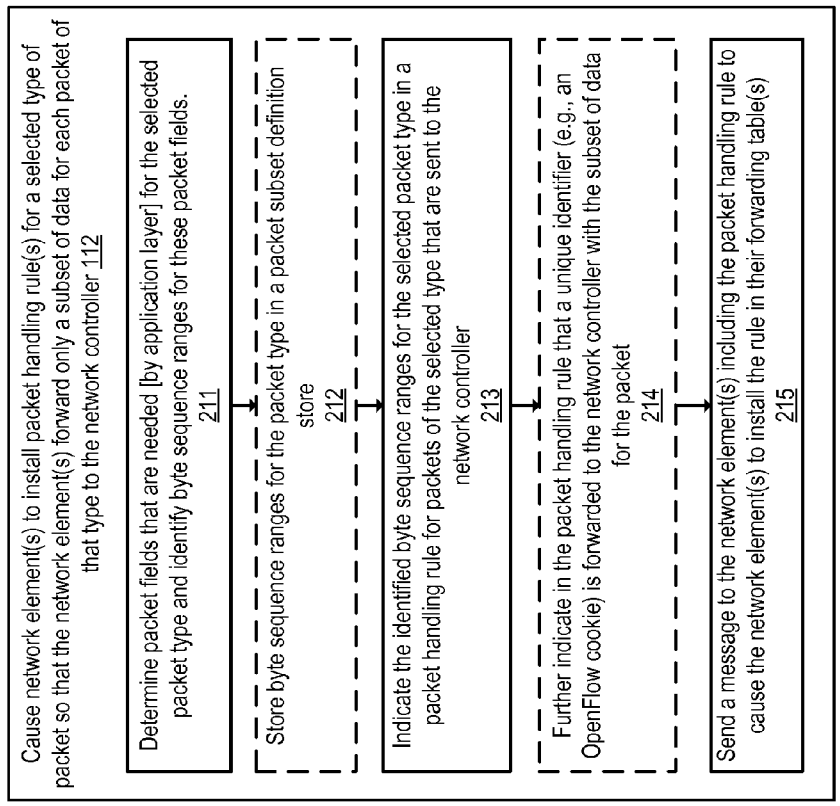
FIG. 2A is a flow chart illustrating in detail the operations of block 112 (circle 1) for a method and system to optimize packet exchange between the control and data plane in a software defined network according to an embodiment of the invention.

FIG. 2A is a flow chart illustrating in detail the operations of block 112 (circle 1) for a method and system to optimize packet exchange between the control and data plane in a software defined network according to an embodiment of the invention. In some embodiments, the operations of block 112 are performed by NC 110.

At block 211, NC 110 determines the packet fields that are needed for the selected packet type and identifies byte sequence ranges for these packet fields. In some embodiments, the selected packet type is used by NE 130 to perform networking functions such as network discovery, network topology mapping, network address assignment, link maintenance, quality of service, etc. Examples of packet types for such functions include those packets of Internet Control Message Protocol (ICMP), Link Layer Discovery Protocol (LLDP), Open Shortest Path First (OSPF), Internet Protocol (IP), Transmission Control Protocol (TCP), Dynamic Host Configuration Protocol (DHCP), etc. When using such packets for these protocols, NE 130 may not need to use or be aware of every field in a packet that has a packet type matching one of these protocols or another protocol.

In some embodiments, the selected packet type is used by an application on an application layer coupled to NE 130. These may be called "northbound applications". These applications on the application layer may be able to communicate with the NC and send or receive network traffic in this way. These applications use the application programming interface (API) provided by the SDN protocol used in the SDN of the NC to interact with the SDN. Such applications may include, network monitoring applications, network statistics applications, network security applications, etc. These applications may utilize packets from some of the same protocols described above, or may use the packets of additional protocols, and thus, additional packet types.

Thus, for each of these packet types, NE 130 determines which packet fields in each of these packet types are needed by NE 130 (or the application layer) and which are not. In some embodiments, NE 130, makes this determination based on configuration provided by a user. In some embodiments, NE 130 analyzes the traffic along the link between NE 130 and the NEs and automatically determines which parts of each packet type are needed at the control plane side. In some embodiments, each packet field that is needed is identified by its byte start offset from the beginning of the packet, along with its length in bytes.

In some embodiments, at block 212, NE 130 stores the byte sequence ranges (byte starts and lengths) for the packet type in a packet subset definition store. In some embodiments, this is the packet subset definition 120 of FIG. 1.

At block 213, NE 130 indicates the identified byte sequence ranges for the selected packet type in a packet handling rule for packets of the selected type that are sent to the network controller. Thus, NE 130 creates a packet handling rule that indicates that these byte sequence ranges should be used on packets that are to be sent to the network controller. In some embodiments, the packet handling rule is similar to a forwarding rule entry in a flow table of the OpenFlow protocol.

In some embodiments, at block 214, NE 130 further indicate in the packet handling rule that a unique identifier is forwarded to the network controller with the subset of data for the packet. Thus, using this part of the packet handling rule, a NE would forward the subset of a packet matching the packet type to the network controller, and also include a unique identifier for that packet type. This may help NE 130 in identifying what type of packet is being received, as the packets are not whole packets but only subsets of packets and so may not have all the typical identifying characteristics normally present in a whole packet. In some embodiments, this unique identifier is an OpenFlow cookie.

At block 215, NE 130 sends a message to the network element(s) in the SDN. The message includes the packet handling rule, and causes the network element(s) to install the packet handling rule in their forwarding table(s). The packet handling rule causes the NE to be able to identify the selected packet type, and when a packet of that packet type is to be forwarded to NE 130, the NE identifies the packet and uses the packet handling rule to take a subset of that packet and send it to NE 130. In some embodiments, this message is an OpenFlow message and the packet handling rule is included in a modified and improved version of an OpenFlow output action structure. Further details regarding this structure will be described with reference to FIG. 4.

Thus, blocks 211-215 detail an exemplary set of operations to carry out the operation of block 112 in FIG. 1.

FIG. 2B is a flow chart illustrating in detail the operations of block 114 (circle 8) for a method and system to optimize packet exchange between the control and data plane in a software defined network according to an embodiment of the invention. In some embodiments, the operations of block 114 are performed by NC 110.

At block 221, NC 110 receive a message from a network element with raw packet bytes. In some embodiments, this is an OpenFlow packet-in message. The raw packet bytes include the data from selected packets that were forwarded by the NEs to NC 110 based on rules (e.g., packet handling rules) in the forwarding table of the NEs.

At block 222, NC 110 determines that the packet bytes received are of a packet of the selected type and only includes a subset of the data of the packet. Thus, the packet bytes are of a packet that is of a type that has a packet handling rule in the NE indicating that when forwarding the packet to NC 110, only a subset of the packet (identified by the byte sequences) should be forwarded to NC 110.

In some embodiments, NC 110 determines that the packet bytes are of a packet of the selected type as the message including the packet bytes includes the unique identifier identifying the packet type. In some embodiments, this unique identifier is specified at block 214. In some embodiments, NC 110 determines that the packet bytes are of a packet of the selected type based on an OpenFlow table ID or OpenFlow reason field in the message that includes the packet bytes. In some embodiments, NC 110 determines that the packet bytes are of a packet of the selected type based on packet byte analysis, the packet subset handling rule store, or other method.

At block 223, NC 110 creates a packet of the selected type that includes the received packet bytes placed in the correct byte locations for the packet for that packet type. Thus, NC 110 creates a packet with the standard structure of that packet type and populates it with the received packet bytes placed at the appropriate locations in the newly created packet. The byte sequence information for where to place the packet bytes may be retrieved from a packet subset definition store, such as packet subset definition store 120. For those fields in the newly created packet where no data from the packet bytes was provided, these are either set to null or blank, set to a default value such as zero, or set to a variety of default values depending upon the field in question. For example, an IP address field might be set to the loopback address "127.0.0.1" to better ensure compatibility with any applications using that newly created packet. As another example, as some packet fields are restricted to certain values, a default value may be chosen from within this range.

At block 224, the newly created packet is processed according to requirements. These may be requirements from NC 110 or from an application on the application layer that is coupled to NC 110. For example, a network monitoring application may wish to read timestamp and host information from an HTTP packet that is created from the packet data.

At block 225, the NC 110 sends a message to the NE for the packet with the appropriate actions. In some embodiments, the message includes the entire packet that has been processed at block 224. In some embodiments, the message includes the buffer identifier of the packet that was received in the message from the NE at block 221. In the case that a buffer identifier is sent to the NE, the NC 110 does not need to include all the bytes of the packet in the message to the NE. Instead, the message may only need to specify the appropriate actions to be taken on the packet (e.g., add "1" to a hop count value or change the source IP address in the packet). When the NE receives the message with the appropriate actions and the buffer identifier, it may retrieve the packet that is associated with that buffer identifier from the buffer in the NE and perform the actions that are specified in the message against the packet. In some embodiments, the message is a packet out message for OpenFlow.

Thus, blocks 221-224 detail an exemplary set of operations to carry out the operation of block 114 in FIG. 1.

FIG. 3A is a flow chart illustrating in detail the operations of block 133 (circle 6) for a method and system to optimize packet exchange between the control and data plane in a software defined network according to an embodiment of the invention. In some embodiments, the operations of block 133 are performed by NE 130.

At block 311, NE 130 determines according to packet handling rules that a received packet is to be forwarded to the network controller and that the received packet is of the selected type such that only a subset of the received packet is to be forwarded to the network controller. Thus, the packet handling rule installed on NE 130 at block 215 by NC 110 causes NE 130 to identify a received packet to be forwarded to the network controller as being of a packet type that should be subset before being forwarded to the network controller.

At block 312, NE 130 creates a message to be sent to the network controller that includes a subset of the received packet according to the packet handling rules for the selected packet type. Thus, NE 130 only includes those bytes specified in the byte sequences of the packet handling rule in the message. In some embodiments, the message is an OpenFlow packet-in message.

In some embodiments, at block 313, NE 130 also sets the unique identifier for that packet type in the message. As described previously, this may help NE 130 to more easily identify the type of the packet, and thus be able to recreate the packet more easily.

In some embodiments, at block 314, NE 130 also sets a buffer identifier for the message and stores the received packet in a buffer. This buffer identifier is unique for each message sent to NC 110. After NC 110 processes the message that includes a buffer identifier, if NC 110 sends a response message back to NE 130, this response message also includes the buffer identifier. This may allow NE 130 to not have to send the entire packet back to NE 130 but rather only send those portions of the packet that need to be modified. NE 130 may then modify the packet as instructed by using the packet with the same buffer identifier stored in the buffer and send out the packet after it has been modified. In some embodiments, the buffer identifier is an OpenFlow buffer ID.

At block 315, the message including the subset of the packet is sent to the network controller.

Thus, blocks 311-315 detail an exemplary set of operations to carry out the operation of block 133 in FIG. 1.

FIG. 3B is a flow chart illustrating in detail the operations of block 134 for a method and system to optimize packet exchange between the control and data plane in a software defined network according to an embodiment of the invention. In some embodiments, the operations of block 134 are performed by NE 130.

At block 321, a message is received from NC 110 which indicates that a packet of the selected type is to be sent to a destination network element. This is a packet that has a packet handling rule stored at NE 130 as shown above. In some embodiments, this message is an OpenFlow packet-out message.

In some embodiments, at block 322, NE 130 determines whether the packet indicated in the message is buffered (using a buffer identifier). If so, at block 323, NE 130 retrieves the packet from the buffer (using the buffer identifier). Otherwise, at block 324, the packet is retrieved from the message itself.

At block 325, NE 130 may apply any requested actions to the indicated packet according to any instructions in the message, and at block 326, the indicated packet is sent to the destination network element.

FIG. 4 illustrates an exemplary structures 400 for defining a set of byte sequences for a packet handling rule to be sent in a message to a network element according to an embodiment of the invention. In some embodiments, this data as organized in these structures is sent in message 153 to NE 130 to cause NE 130 to install a packet handling rule for a selected type of packet so that NE 130 forwards only a subset of data for each packet of that type to the network controller when requested. In some embodiments, the structure is an improvement on an OpenFlow ofp_action_output structure, but is not the same.

Lines 412, 413, and 414 of the structure define a type, a length, and a port variable, respectively. The value in "length" specifies the length of the structure including the byte sequence definitions. The value in "type" defines an action type for the message. The value in "port" defines where to send the message.

Line 415 defines a "field" array that includes one or more packet range sub-structures. Each of these sub-structures is further defined in lines 418-420. Line 419 defines each packet range sub-structure to have a start_index variable that indicates the starting index of the byte of one byte sequence, and line 420 defines a len variable that indicates the length of the byte sequence starting from the start_index value. Using an array of these packet range sub-structures, the fields array can define the byte sequence(s) for a type of packet that should be forwarded to NE 130 when requested.

Figure 5A:
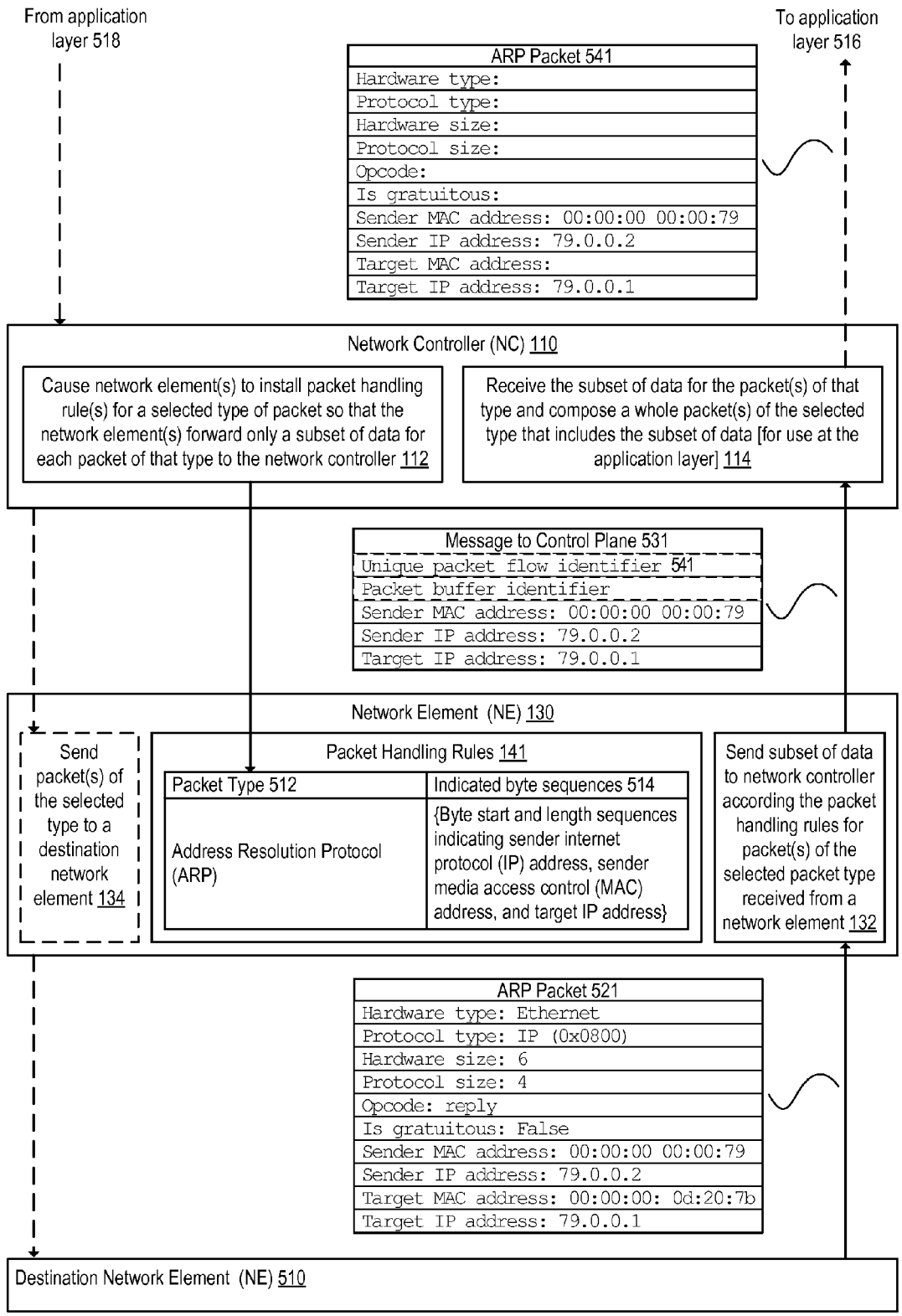
FIG. 5A illustrates an exemplary flow 501 for an ARP packet 521 using exemplary packet handling rules according to an embodiments of the invention.

FIG. 5A illustrates an exemplary flow 501 for an ARP packet 521 using exemplary packet handling rules according to an embodiments of the invention.

Figure 5B:
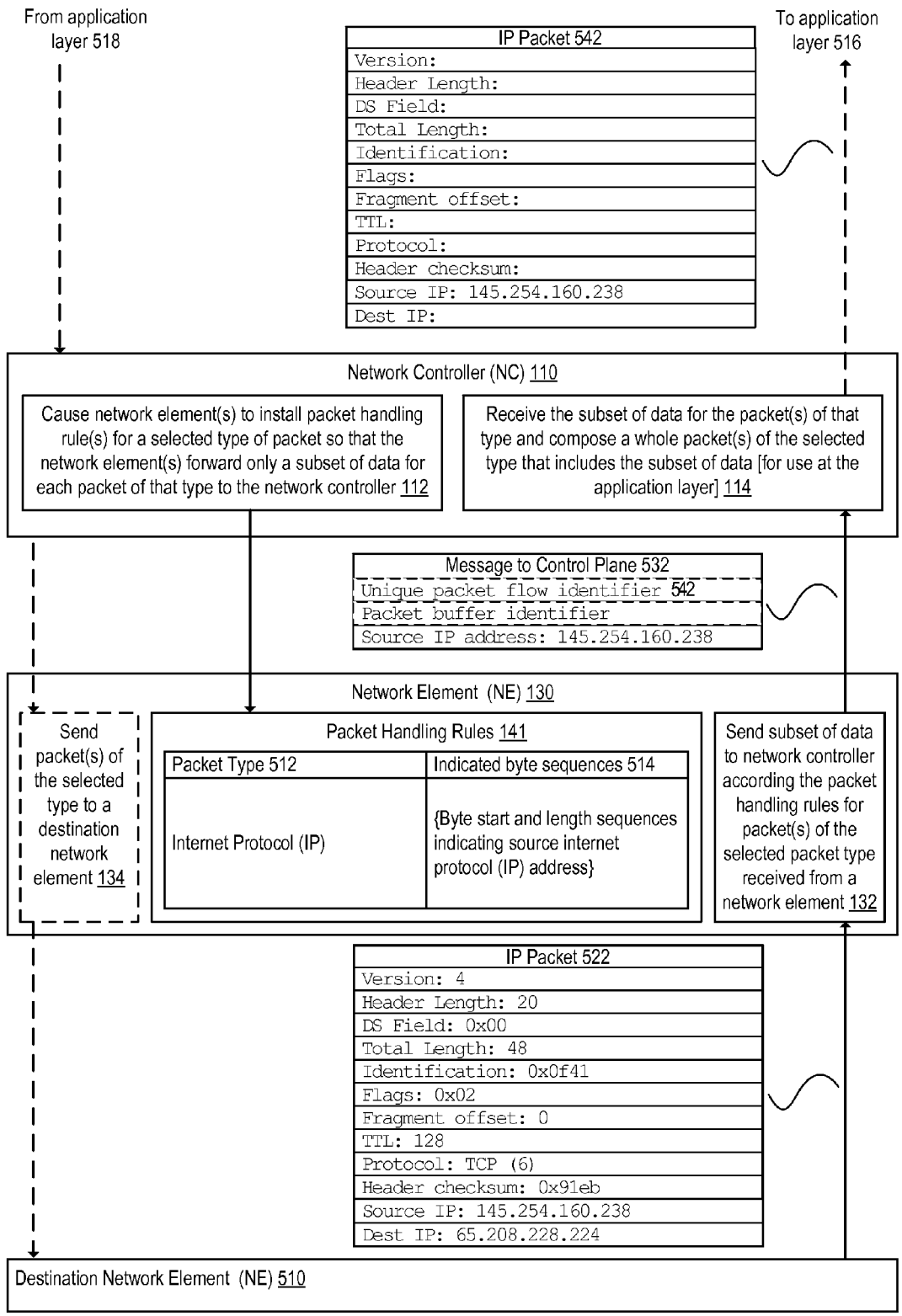
FIG. 5B illustrates an exemplary flow 502 for an IP packet 522 using exemplary packet handling rules according to an embodiments of the invention.
Figure 5C:
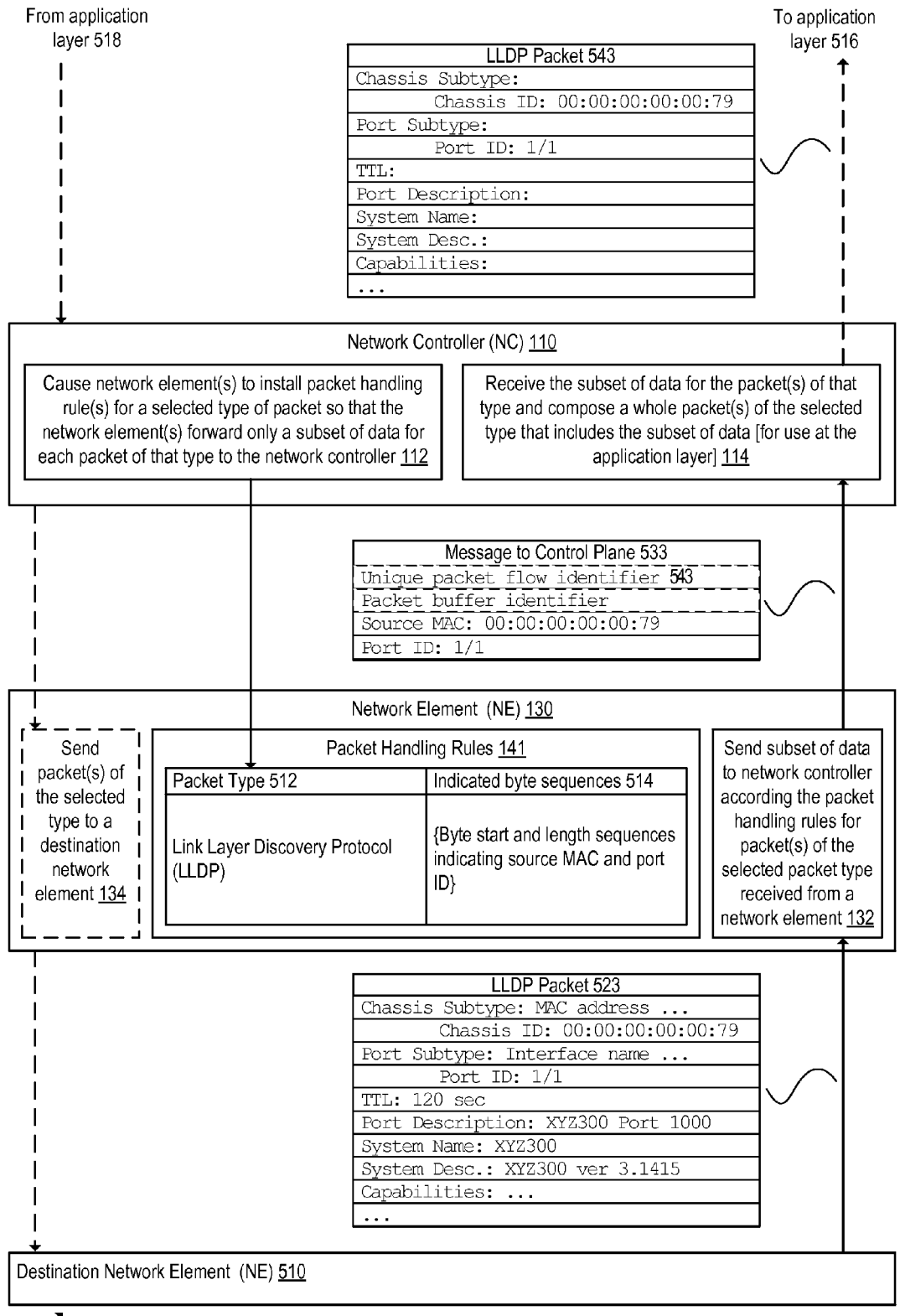
FIG. 5C illustrates an exemplary flow for an LLDP packet 523 using exemplary packet handling rules according to an embodiments of the invention.

FIG. 5A illustrates an address resolution protocol (ARP) packet 521 that is sent from the destination network element 510 to NE 130. The ARP packet 521 includes all the fields standard to an ARP packet, such as Hardware type, Sender media access code (MAC) address, etc. Note that although the packets in FIGS. 5A-5C are shown with header descriptions, such as "Protocol type", in reality the packets would not have these descriptions and would simply include the associated data. The header descriptions are thus only shown for ease of understanding.

Previously, NC 110 has caused a packet handling rule with indicated byte sequences 514-for a packet type 512 matching ARP packets to be installed on NE 130. The indicated byte sequence 514 for the ARP type packets indicates byte start and length sequences for the sender internet protocol (IP) address, sender MAC address, and target IP address fields in the ARP packet. Thus, at block 132, NE 130 uses the packet handling rules 141 and specifically the indicated byte sequences 514 for ARP packets to send a message to the control plane 531 including only the ARP packet indicated byte sequences in the packet handling rules for ARP packet 521. In some embodiments, message 521 also includes a unique packet flow identifier 541 and a buffer identifier. After receiving the message to control plane 531, NE 130 at block 114 may take the subset data in the message 531, and using the methods described above, recreates a whole version of the ARP packet 521 as ARP packet 541. ARP packet 541 may not have any other data in it other than the indicated byte sequences of ARP packet 521 at the correct byte locations. ARP packet 541 may also include default or zero values in these other locations to improve compatibility. In some embodiments, ARP packet 541 is sent to application layer 516. In other embodiments, ARP packet 541 is used by NC 110.

For example, NE 130 may need to resolve the MAC address of an external entity using ARP. The NC 110 may first send out an ARP request for the external entity. Once NE 130 receives the message 531 from NE 130 that includes the ARP packet (i.e., the ARP reply), NE 130 identifies the corresponding ARP request by matching the sender and target IP address and for this ARP request, and the NC 100 identifies the MAC address of the external entity by looking at the sender MAC address. Thus, as shown above, only the sender MAC address, sender IP address, and target IP address are needed.

In a scenario with 1000 NE's acting as the data plane of an SDN, with each NE attached to ten external entities not under control of the SDN, then 10,000 ARP reply packets could be exchanged between the NEs and the NC. By sending the entire ARP reply packet, 56 Kbytes are generated. However, by sending only the fields described above, only 14 Kbytes total of traffic are generated. This is a 75% savings in bandwidth used between the control plane and the data plane. As the ARP packets may have a short expiry time, the periodic resending of these messages may result in a large amount of traffic, and thus the ability to save a large amount of bandwidth used is very advantageous.

FIG. 5B illustrates an exemplary flow 502 for an IP packet 522 using exemplary packet handling rules according to an embodiments of the invention.

Referring to FIG. 5B, an Internet Protocol (ARP) packet 522 is sent from the destination network element 510 to NE 130. NE 130 has previously been caused by NC 110 to install packet handling rules for IP packet types. The rule for the IP packet type has an indicated byte sequence 514 for the byte start location and byte offset for the source IP address in the IP packet. Thus, at block 132, NE 130 sends the message 532 to the control plane with only the source IP address from the IP packet 522. In some embodiments, a unique identifier 542 and a buffer identifier as described above are included in the message 532.

When NC 110 receives the message 532, NC 110 recreates an IP packet and fills the source IP field with the source IP address received from message 532 in a manner similar to what was described above. This recreated IP packet may then be forwarded to an application in the application layer 516.

FIG. 5C illustrates an exemplary flow for an LLDP packet 523 using exemplary packet handling rules according to an embodiments of the invention.

Referring to FIG. 5B, a multi-cast Link Layer Discover Protocol (LLDP) packet 523 is sent from the destination network element 510 to NE 130. NE 130 has previously been caused by NC 110 to install packet handling rules for LLDP packet types. The rule for the LLDP packet type has an indicated byte sequence 514 for the byte start location and byte offset for the source MAC address and port ID in the LLDP packet. Thus, at block 132, NE 130 sends the message 533 to the control plane with the source MAC address and Port ID from the LLDP packet 523. Note that these two byte sequences are not consecutive. In some embodiments, a unique identifier 543 and a buffer identifier as described above are included in the message 533.

When NC 110 receives the message 533, NC 110 recreates an LLDP packet and fills the source MAC and port ID fields with the data received in message 533 in a manner similar to what was described above. This recreated LLDP packet may then be forwarded to an application in the application layer 516.

Figure 6:
FIG. 6 is a flow diagram illustrating a method 600 for optimizing packet exchange between the control and data plane in a software defined network according to an embodiment of the invention.

FIG. 6 is a flow diagram illustrating a method 600 for optimizing packet exchange between the control and data plane in a software defined network according to an embodiment of the invention. For example, method 600 can be performed by NC 110. Method 600 may be implemented in software, firmware, hardware, or any combination thereof.

At 602, NC 110 causes the plurality of NEs to install one or more packet handling rules for a selected type of packet so that the NEs forward only a subset of data for each packet of the selected type to the network controller. In some embodiments, this further comprises determining one or more packet fields that are needed for the selected packet type and identifying byte sequence ranges for these packet fields; indicating the identified byte sequence ranges for the selected packet type in a packet handling rule for packets of the selected type that are sent to the network controller, wherein each byte sequence range includes a byte start value and a byte length value; and sending a message including the packet handling rule to the plurality of NEs to cause the plurality of NEs to install the packet handling rule in their forwarding tables. In some embodiments, this further comprises indicating in the packet handling rule for packets of the selected type that a unique identifier for the selected packet type is included with the subset of data that is sent to the network controller.

In some embodiments, the one or more packet fields are determined to be needed for the selected packet type based upon analyzing packet fields of that packet type used by applications in an application layer, wherein the application layer is coupled to the network controller at a northbound interface.

At 604, NC 110 receives the subset of data for each packet of the selected type and composing a whole packet of the selected type that includes the subset of data. In some embodiments, this further comprises receiving a message from a network element with raw packet bytes; determining based on at least one of a unique identifier in the message and analysis of the raw packet bytes that the raw packet bytes are of a packet of the selected type and only includes the subset of data for the packet type; and creating the whole packet of the selected type that includes the raw packet bytes placed in the correct byte locations for that packet type.

In some embodiments, the selected packet type is an address resolution protocol (ARP) type packet, and wherein the subset of data includes the sender media access control (MAC) address, sender Internet protocol (IP) address, and target IP address.

The operations in the flow diagrams have been described with reference to the exemplary embodiments of the other figures. However, it should be understood that the operations of this flow diagram can be performed by embodiments of the invention other than those discussed with reference to the other figures, and the embodiments of the invention discussed with reference to these other figures can perform operations different than those discussed with reference to the flow diagrams.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of a lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

In some embodiments, each of the virtual network elements 730A-R performs the functionality of a network element as described with reference to FIGS. 1-6. In some embodiments, networking software 720 includes a Control Plane Message Optimizer module 721 that includes software that when executed by the networking hardware 710 causes each VNE 732A-R to be able to perform the functionality of receiving packet handling rules and sending optimized messages to the control plane as described in reference to FIGS. 1-6.

The special-purpose network device 702 is often physically and/or logically considered to include: 1) optionally, a ND control plane 724 (sometimes referred to as a control plane) comprising the compute resource(s) 712 that execute the control communication and configuration module(s)

732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). In some embodiments, ND 702 does not include a control card. These cards are coupled together through one or more interconnect mechanisms illustrated as backplane 736 (e.g., a first full mesh coupling the line cards and a second full mesh coupling all of the cards). Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R.

In some embodiments, a virtual network element 760 performs the functionality of a network element as described with reference to FIGS. 1-6. In some embodiments, networking software 750 includes a Control Plane Message Optimizer module 751 that includes software that when executed by the processors 742 causes each virtual network element(s) 760A-R to be able to perform the functionality of receiving packet handling rules and sending optimized messages to the control plane as described in reference to FIGS. 1-6.

The virtual network element(s) 760A-R perform similar functionality to the virtual network element(s) 730A-R. For instance, the hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)). The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 7C:
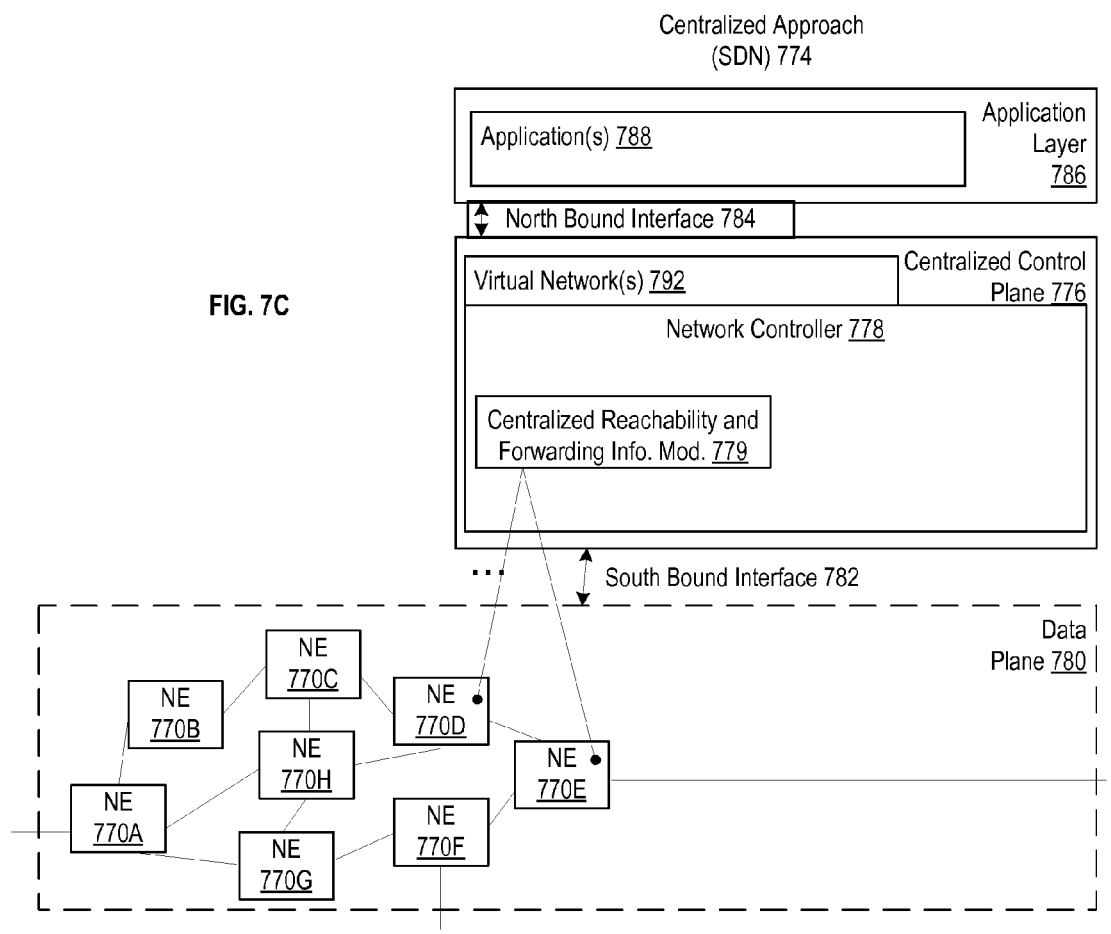
FIG. 7C illustrates a network with a single network element (NE) on each of the NDs of FIG. 7A, and within this straight forward approach contrasts a traditional distributed approach (commonly used by traditional routers) with a centralized approach for maintaining reachability and forwarding information (also called network control), according to some embodiments of the invention.

FIG. 7C illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7C illustrates network elements (NEs) 770A-H with the same connectivity as the NDs 700A-H of FIG. 7A.

FIG. 7C illustrates a centralized approach 774 (also known as software defined networking (SDN)) that decouples the system that makes decisions about where traffic is sent from the underlying systems that forwards traffic to the selected destination. In some embodiments, this centralized approach is used for the SDN as described with reference to FIGS. 1-4. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs. In some embodiments, network controller 778 includes the functionality of the network controller 116 as described with reference to FIGS. 1-4.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 7A60A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 7A60A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7C also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7C illustrates the simple case where each of the NDs 700A-H implements a single NE 770A-H, it should be understood that the network control approaches described with reference to FIG. 7C also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
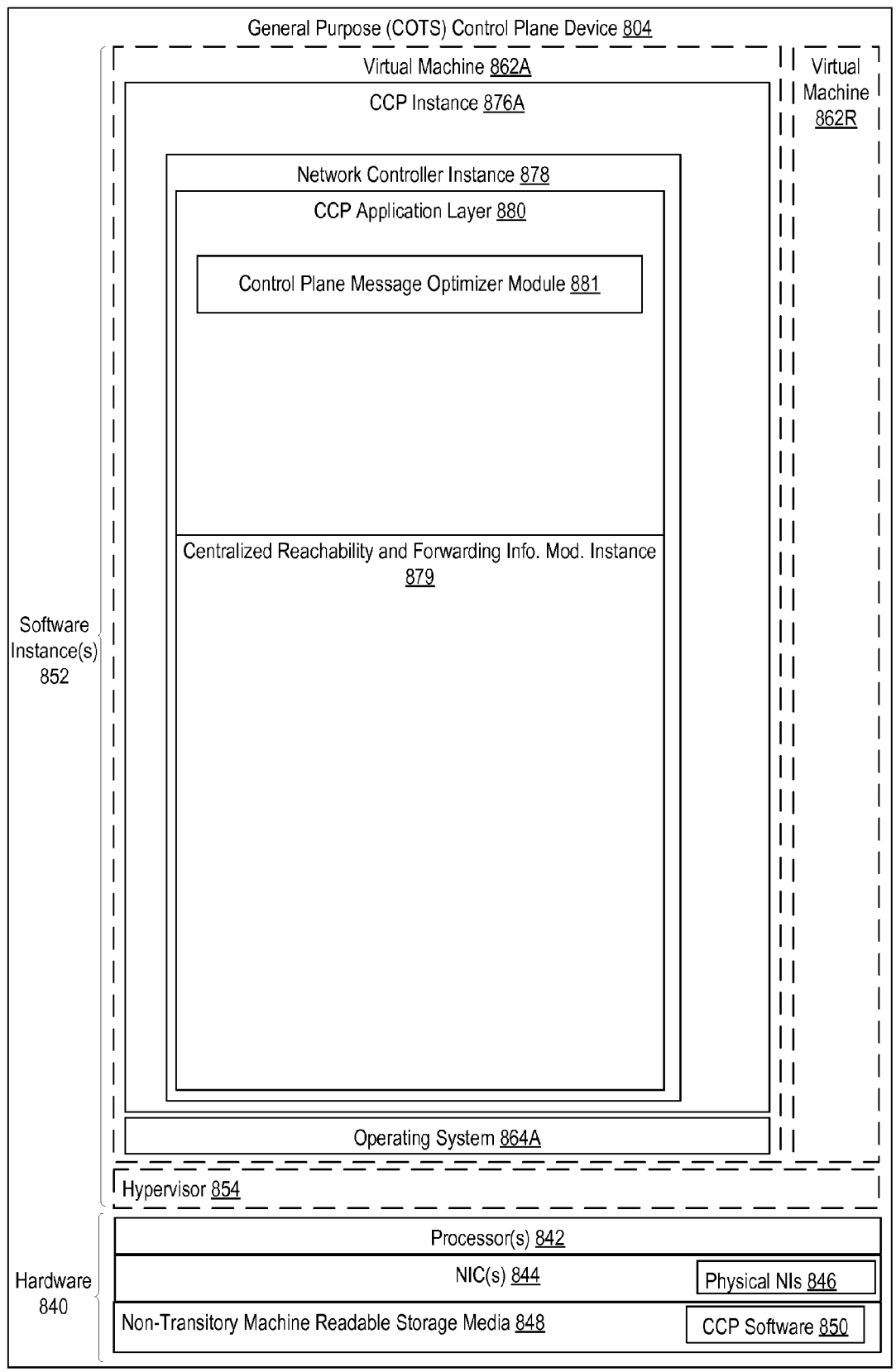
FIG. 8 illustrates a general purpose control plane device 804 including hardware 840 comprising a set of one or more processor(s) 842 (which are often Commercial off-the-shelf (COTS) processors) and network interface controller(s) 844 (NICs; also known as network interface cards) (which include physical NIs 846), as well as non-transitory machine readable storage media 848 having stored therein centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a hypervisor 854 (sometimes referred to as a virtual machine monitor (VMM)) and one or more virtual machines 862A-R that are run by the hypervisor 854; which are collectively referred to as software instance(s) 852. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 850 (illustrated as CCP instance 876A) on top of an operating system 864A are typically executed within the virtual machine 862A. In embodiments where compute virtualization is not used, the CCP instance 876A on top of operating system 864A is executed on the "bare metal" general purpose control plane device 804.

The operating system 864A provides basic processing, input/output (I/O), and networking capabilities. In some embodiments, the CCP instance 876A includes a network controller instance 878. The network controller instance 878 includes a centralized reachability and forwarding information module instance 879 (which is a middleware layer providing the context of the network controller 778 to the operating system 864A and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view.

In some embodiments, network controller instance 878 includes the functionality of the network controller 116 as described with reference to FIGS. 1-4.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows defined by the destination IP address for example; however, in other implementations the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

In some embodiments, CCP application layer 880 includes a Control Plane Message Optimizer module 881 that includes the functionality of the NC 110 as described with reference to FIGS. 1-6.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network controller of a control plane in a software defined network (SDN) coupled to a plurality of network elements (NEs) of a data plane in the SDN, comprising:
   causing the plurality of NEs to install one or more packet handling rules for a selected type of packet so that the NEs forward only a subset of data for each packet of the selected type to the network controller, wherein the causing the plurality of NEs to install the one or more packet handling rules for the selected type of packet further comprises:
      determining one or more packet fields that are needed for the selected packet type and identifying byte sequence ranges for these packet fields;
      indicating the identified byte sequence ranges for the selected packet type in a packet handling rule for packets of the selected type that are sent to the network controller, wherein each byte sequence range includes a byte start value and a byte length value; and
      sending a message including the packet handling rule to the plurality of NEs to cause the plurality of NEs to install the packet handling rule in their forwarding tables; and
   receiving the subset of data for each packet of the selected type and composing a whole packet of the selected type that includes the subset of data.

2. The method of claim 1, further comprising:
   indicating in the packet handling rule for packets of the selected type that a unique identifier for the selected packet type is included with the subset of data that is sent to the network controller.

3. The method of claim 1, wherein the SDN is an OpenFlow network.

4. The method of claim 1, wherein the one or more packet fields are determined to be needed for the selected packet type based upon analyzing packet fields of that packet type used by applications in an application layer, wherein the application layer is coupled to the network controller at a northbound interface.

5. The method of claim 1, wherein the receiving the subset of data for each packet type of the selected type further comprises:
   receiving a message from a network element with raw packet bytes;
   determining based on at least one of a unique identifier in the message and analysis of the raw packet bytes that the raw packet bytes are of a packet of the selected type and only includes the subset of data for the packet type; and
   creating the whole packet of the selected type that includes the raw packet bytes placed in correct byte locations for that packet type.

6. The method of claim 1, wherein the selected packet type is an address resolution protocol (ARP) type packet, and wherein the subset of data includes a sender media access control (MAC) address, a sender Internet protocol (IP) address, and a target IP address.

7. A network controller of a control plane in a software defined network (SDN) coupled to a plurality of network elements (NEs) of a data plane in the SDN, comprising:
   a processor and a memory, said memory containing instructions executable by the processor whereby the network controller is operative to:
      cause the plurality of NEs to install one or more packet handling rules for a selected type of packet so that the NEs forward only a subset of data for each packet of the selected type to the network controller, wherein causing of the plurality of NEs to install one or more packet handling rules for the selected type of packet includes further operations to:
         determine one or more packet fields that are needed for the selected packet type and identifying byte sequence ranges for these packet fields,
         indicate the identified byte sequence ranges for the selected packet type in a packet handling rule for packets of the selected type that are sent to the network controller, wherein each byte sequence range includes a byte start value and a byte length value, and
         send a message including the packet handling rule to the plurality of NEs to cause the plurality of NEs to install the packet handling rule in their forwarding tables; and
      receive the subset of data for each packet of the selected type and composing a whole packet of the selected type that includes the subset of data.

8. The network controller of claim 7, wherein the memory contains further instructions executable by the processor whereby the network controller is further operative to:
   indicate in the packet handling rule for packets of the selected type that a unique identifier for the selected packet type is included with the subset of data that is sent to the network controller.

9. The network controller of claim 7, wherein the SDN is an OpenFlow network.

10. The network controller of claim 7, wherein the one or more packet fields are determined to be needed for the selected packet type based upon analyzing packet fields of that packet type that are used by applications in an application layer, wherein the application layer is coupled to the network controller at a northbound interface.

11. The network controller of claim 7, wherein the receiving the subset of data for each packet type of the selected type includes further operations to:
   receive a message from a network element with raw packet bytes;
   determine based on at least one of a unique identifier in the message and analysis of the raw packet bytes that the raw packet bytes are of a packet of the selected type and only includes the subset of data for the packet type; and
   create the whole packet of the selected type that includes the raw packet bytes placed in correct byte locations for that packet type.

12. The network controller of claim 7, wherein the selected packet type is an address resolution protocol (ARP) type packet, and wherein the subset of data includes a sender media access control (MAC) address, a sender Internet protocol (IP) address, and a target IP address.

13. A non-transitory computer-readable storage medium having instructions stored therein, wherein the instructions, when executed by a processor of a network controller of a control plane in a software defined network (SDN) coupled to a plurality of network elements (NEs) of a data plane in the SDN, cause the processor to perform operations comprising:

causing the plurality of NEs to install one or more packet handling rules for a selected type of packet so that the NEs forward only a subset of data for each packet of the selected type to the network controller, wherein the causing the plurality of NEs to install the one or more packet handling rules for the selected type of packet further comprises:
- determining one or more packet fields that are needed for the selected packet type and identifying byte sequence ranges for these packet fields;
- indicating the identified byte sequence ranges for the selected packet type in a packet handling rule for packets of the selected type that are sent to the network controller, wherein each byte sequence range includes a byte start value and a byte length value; and
- sending a message including the packet handling rule to the plurality of NEs to cause the plurality of NEs to install the packet handling rule in their forwarding tables; and receiving the subset of data for each packet of the selected type and composing a whole packet of the selected type that includes the subset of data.

14. The non-transitory computer-readable storage medium of claim 13, comprising further instructions that when executed by a processor cause the processor to perform operations comprising:
- indicating in the packet handling rule for packets of the selected type that a unique identifier for the selected packet type is included with the subset of data that is sent to the network controller.

15. The non-transitory computer-readable storage medium of claim 13, wherein the SDN is an OpenFlow network.

16. The non-transitory computer-readable storage medium of claim 13, wherein the one or more packet fields are determined to be needed for the selected packet type based upon analyzing packet fields of that packet type used by applications in an application layer, wherein the application layer is coupled to the network controller at a northbound interface.

17. The non-transitory computer-readable storage medium of claim 13, wherein he receiving the subset of data for each packet type of the selected type further comprises:
- receiving a message from a network element with raw packet bytes;
- determining based on at least one of a unique identifier in the message and analysis of the raw packet bytes that the raw packet bytes are of a packet of the selected type and only includes the subset of data for the packet type; and
- creating the whole packet of the selected type that includes the raw packet bytes placed in correct byte locations for that packet type.

18. The non-transitory computer-readable storage medium of claim 13, wherein the selected packet type is an address resolution protocol (ARP) type packet, and wherein the subset of data includes a sender media access control (MAC) address, a sender Internet protocol (IP) address, and a target IP address.

* * * * *